United States Patent [19]

Aulner, Sr. et al.

[11] 3,913,619

[45] Oct. 21, 1975

[54] HYDRAULIC SYSTEM AIR BLEEDER VALVE ASSEMBLY WITH ANTIVIBRATION SPRING RETAINER

[76] Inventors: Marvin J. Aulner, Sr., 423 S. Rhode Island St.; Albert W. Aulner, 518 S. Denver St., both of Hastings, Nebr. 68901

[22] Filed: Mar. 1, 1974

[21] Appl. No.: 447,351

[52] U.S. Cl............. 137/614.17; 184/88 R; 188/352
[51] Int. Cl.²......................................... F16K 15/00
[58] Field of Search............ 137/539, 543.17, 454.5, 137/614.17, 599.2; 188/352, 152; 251/155, 251/150; 60/53; 244/103; 184/88 R, 105 B

[56] References Cited
UNITED STATES PATENTS

| | | | |
|---|---|---|---|
| 2,530,888 | 11/1950 | Marchelewicz | 184/88 R |
| 2,896,663 | 7/1959 | Mena | 137/539 |
| 3,042,071 | 7/1962 | Van Tuyl | 137/614.17 X |
| 3,050,080 | 8/1962 | Pagano | 137/614.17 |

FOREIGN PATENTS OR APPLICATIONS

| | | | |
|---|---|---|---|
| 231,380 | 4/1959 | Australia | 188/352 |

*Primary Examiner*—Martin P. Schwadron
*Assistant Examiner*—Robert J. Miller

[57] ABSTRACT

An air bleeder valve assembly for hydraulic systems, mountable in the bleeder outlet and containing a check valve the spring of which is held in place by a spring retainer exerting a constant pressure against the walls of an air bleeder passage through the plug and specifically being a roll-pin, the outer end of the plug having on it a sealer cap received on a sealer cap receiving bulbous portion of the plug.

8 Claims, 7 Drawing Figures

HYDRAULIC SYSTEM AIR BLEEDER VALVE ASSEMBLY WITH ANTIVIBRATION SPRING RETAINER

FIELD OF THE INVENTION

This invention is in the field of hydraulic systems and particularly automotive brake hydraulic systems, from which air must be removed following any opening of the system for repairs.

DESCRIPTION OF THE PRIOR ART

Removing the air from hydraulic systems of automobiles has required two men, one inside the automobile to pump the brakes, and another to observe when the air has been bled out and then to tighten the closure fitting of the air bleeder outlet while the first operator maintains the brake pedal in a depressed state so as to seal the outlet before more air can be pulled into the system by a rising brake pedal.

It has long been recognized in the art that the solution to this problem can be accomplished by a combination closure and bleeder valve assembly for threaded mounting in the bleeder outlet opening, with one of these assemblies used at each of the wheel brake cylinders.

However, the combination closure and bleeder check valve assemblies of the prior art have not provided the right combination of economy and efficiency. As a consequence, the major problem still remains unsolved.

The high cost of labor makes it desirable to leave the combination closure and bleeder valve assembly permanently in the wheel cylinder at each wheel of the automobile long after a single bleeding has been finished. The high cost of labor indicates that it is desirable not to remove the bleeder check valve assemblies because the time it takes to remove them is additional labor-time expense and the costs of a mechanic have become as high as over $5.00 an hour in many areas of the country.

The combination closure and bleeder valve assemblies have been proposed before for the purpose of permanent mounting in wheel cylinders and particularly this was proposed in U.S. Pat. No. 2,771,093, issued to H. O. Wilson Nov. 20, 1956, and titled: BLEEDER VALVE FOR HYDRAULIC BRAKE SYSTEMS. Although the Wilson bleeder valve was designed for permanent mounting, yet it is important that a permanent mounted valve be as inexpensive as possible because a service station will not use permanent reliever valve assemblies unless they are very inexpensive because they must become part of the cost of a single item of brake work, even though they remain on the automobile permanently thereafter.

And so permanent mounting of such assemblies raises the cost of the particular brake repair job going against the reputation of a service station for economy in their brake work if there is any extra eliminatable cost to the permanent bleeder check valve assemblies. This is said even though it is recognized that the use of no combination bleeder check valve assemblies at all is even much more expensive because two mechanics are required, one to pump the pedal and one to twist shut the common type of bleeder opening closure.

And so economy plays a big part because a single combination closure and bleeder valve assembly will ordinarily not be moved from wheel to wheel, at an ideal, because its removal has a time-labor cost.

It would be particularly desirable to have permanently mounted bleeder check valve assemblies on each wheel brake cylinder because in that way all our of the wheel brake cylinders are bled of their air at one time, by one man if only a sufficiently economical and practical bleeder check valve assembly could by found.

A disadvantage of earlier bleeder check valve assemblies, as a matter of practicality, has been the use in such assemblies of a threaded sleeve for maintaining the check valve spring in place. Such threaded sleeves come out of place in the thousands of road vibrations experineced in a short time. When a threaded spring retainer falls out, the check valve becomes useless and cannot be used for later line bleeding.

This invention is not the first time that a check valve spring in a bleeder assembly has been proposed to be retained in place by a threadless member exerting continuous pressure, because such a member was also shown in U.S. Pat. No. 2,069,606 to L. Gary et al, issued Feb. 2, 1937, and titled: Device for Bleeding Hydraulic Brakes.

The spring retaining means in the Gary patent is not held in place by threads, but is called a stem and is held in place by other means. Such a stem can be pressed in without heat, but if put in by that means the tolerances of fit that are required result in high expense of machine because they must be such tolerances and also result in a danger that the spring retainer stem might come out during car vibration, because great pressure between spring retainer and the walls of the fluid passage opening is not possible because of the limitations of inserting such a retainer without the use of heat.

A further problem is that if heat is used to make possible the insertion of a spring retainer sleeve that would have a tight fit against the walls of the air passage openings for preventing the sleeve from coming out of place during road travel, then the cost of such heat insertion raises the cost of the bleeder assembly, as is serious because this bleeder assembly is best used, not at each wheel, but one at each wheel and left there permanently which multiplies the cost by each wheel involved. It is important to prevent road dirt from getting into the check valve of such an assembly. Since dirt can enter freely through the sleeve that retains the spring, it is therefore, necessary to close the outer end of such a sleeve by some means. One type of closure means has been the use of a threaded plug. But such plugs can vibrate loose and fall off. Another such means proposed in the prior art has been the use of a cotter pin to hold such plug in place. However, a cotter pin requires a costly hole for its reception, thereby also increasing the cost of the bleeder valve assembly an undesired amount.

Another problem of heat insertion or "sweating in" of a spring retainer sleeve is that the heat causes the spring to lose its temper. This causes a dilemma: (1) either too little heat is used and the retainer is not firmly held and springs become lost in road use vibrations, or (2) the heat is adequate for retainer insertion, but causes the springs to lose their temper, become ineffective and allow air to enter the system during bleeding operations. The Gary and Wilson patents also have the disadvantage of the impossibility of use therewith of a standard grease fitting dust-cover. Road dust can prevent proper operation and seating of the check-valves.

The high cost of machining exact tolerances (within 0.0005-inch) needed for fitting in a heat-fitted spring retainer sleeve is a main problem to be avoided since low price is so vital to acceptance of four check valve bleeder assemblies to be billed to one brake customer.

The reason cost is so important is that the bleeder assemblies are to be left on an automobile to avoid the labor cost of their removal and further because, even though the car owner will have them for his benefit upon the occasion of later brake jobs, yet it is their first cost as represented in his bill for brake service that is his immediate concern and payment problem and, therefore, the concern of the people doing the brake service because of their need to seem competitive in order to keep the business or to get the business in the first place in our competitive economy.

The Gary U.S. Pat. No. 2,069,606 has no way to prevent its check valve from leaking fluid out of the brake system in normal automobile use after the air bleeding of the brake system has been finished.

The mere removal of a bleeder valve assembly and its replacement with a plug will usually allow air to enter the system during the quick replacement of a plug for a bleeder valve assembly. If two people are on the job, one to pump the brakes, while the other does the quick replacement of the plug for the bleeder valve assembly, then less air gets back into the system, but the labor-cost of having two men on the job is much more substantial than might be supposed for two main reasons: (1) this quick replacement of plug for bleeder valve must be done to each of four wheels, and (2) experience shows that when personnel leave one job for another, they are tempted to stop for a cigarette, a drink of water, or a trip to the men's room, conversation, or one of many other distractions, so that the net cost in lost labor-time is substantial.

Of further interest are the patents issued to: W. C. Popovich, U.S. Pat. No. 2,865,398, issued Dec. 23,1958, and titled: HYDRAULIC BRAKE BLEEDING CHECK VALVE; and to C. R. Carline, U.S. Pat. No. 2,256,516, issued Sept. 23, 1941, and titled: BLEEDER FITTING FOR BRAKE CYLINDERS.

Popovich and Carlin both have the same disadvantages as above described with respect to the Gary patent, since in both of these patents an exchange of the plug for the bleeder valve assembly must be made because, in both of these patents, the bleeder valve assemblies are not designed to remain on an automobile in road travel and hydraulic fluid would drain out if they were used in road travel.

The patent to Wilson, U.S. Pat. No. 2,771,093, has a bleeder valve assembly whcih could be used during road travel, except for the danger that road vibration could cause its threaded spring retainer to come out, as would cause his spring and valve to come out also, thereby rendering his bleeder assembly useless for future bleeding, except for the holding effect of his outer plug as a lock feature preventing this. However, the cost of an outer plug, which has costly threads and involves costly assembly, as in Wilson U.S. Pat. No. 2,771,093, is very important, and with a special externally threaded annular spring retainer, also used, the cost is compounded excessively, in our opinion, for such a cost-critical type of product.

SUMMARY OF THE INVENTION

An air bleeder valve assembly for hydraulic systems threadly mountable in the bleeder outlet and having a body containing a check valve, the spring of which is held in place by a spring retainer which can be quickly put in place by a sliding motion to assist in keeping the costs to a necessary minimum, as accomplished by using a rollpin of a C-shape in cross-section held against the walls of a passage through the body by exerting a constant pressure against the walls of the passage because of the resiliency of the roll-pin, whereby costly exactness of machining tolerances is not necessary and so that the cost of the assembly can be reduced to a point wherein it can be appealing to those who must sell it to a customer who purchases four such assemblies with the cost of a single brake job since the assemblies are to be left in the bleeder outlet openings to avoid the cost of the time required for their removal.

A combination closure and bleeder valve assembly as described in which the retainer for the spring is not necessarily a roll-pin but having a feature that an outer portion of the body is of a bulbous shape and in further combination with a dust cap having an opening in one side which is normally of a lesser size than the maximum circumference of the bulbous portion, the cap being sufficiently resilient so as to permit its opening to receive therethrough the bulbous portion by the stretching of the walls of the opening temporarily, whereby after the cap is in place, it will fit around that section of the bulbous portion which is of maximum diameter in a manner for holding the dust cap in place to seal dust from entering the passage in the body, whereby since the assembly is protected from dust, it is a practical bleeder valve assembly for permanent mounting to avoid the labor cost of its removal, and whereby it is available for reuse in bleeding air from the hydraulic system throughout the life of the system.

The combination closure and bleeder valver assembly of this invention further has in combination a construction at the inner end of its body for providing a surface for the sealing off of the bleeder outlet opening of the hydraulic system and yet has provision for the unsealing so that fluid can flow from the bleeder outlet opening into the bleeder passage in the bleeder valve assembly body whenever the body has been threadedly backed off a slight distance from a seating or sealing contact with a conventional shoulder in the bleeder outlet opening.

DESCRIPTION OF THE PREFERRED EMBODIMENT

Figure 1:
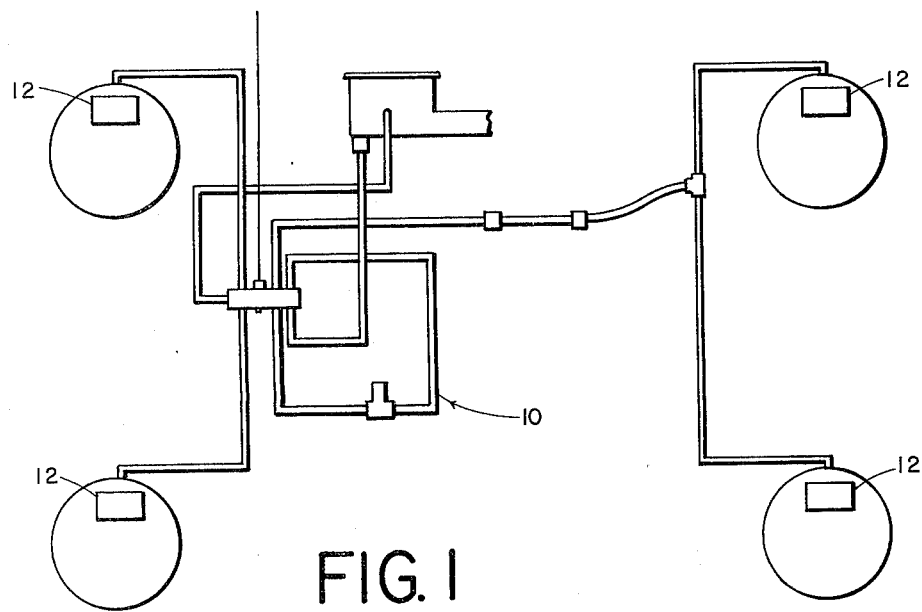
FIG. 1 is a diagram of the hydraulic system of the brake assembly of an automobile.

The combination closure and bleeder valve assembly of this invention is for use on a hydraulic system generally indicated, for example, at 10 in FIG. 1. The hydraulic system 10 is of the type used in automobiles and is provided with hydraulic cylinders at 12 which are disposed one at each of the wheels and which are the standard braking hydraulic cylinders of the automobile.

When it is desired to remove the air from the hydraulic system 10, it is done by having one operator press on the foot pedal for the brake while sitting behind the wheel of the automobile, causing fluid in the system to be delivered out to the wheel cylinders.

Figure 2:
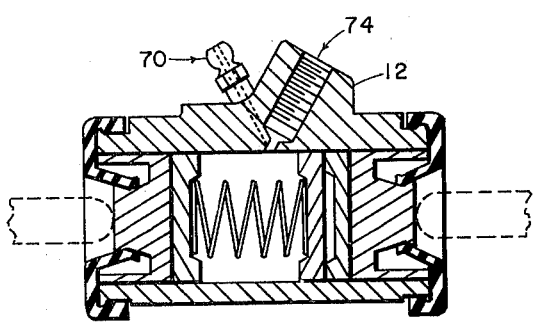
FIG. 2 is a vertical cross-sectional view taken through the brake cylinder of one of the wheels of the automobile hydraulic system of FIG. 1 and showing a combination closure and bleeder valve assembly of this invention mounted thereon.
Figure 7:
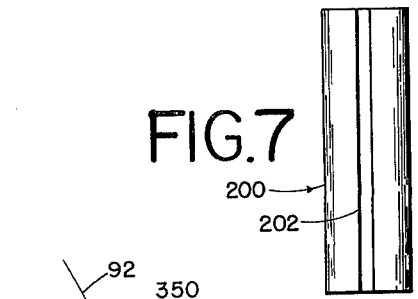
FIG. 7 is a frontal elevation of the roll-pin as it would be seen looking at FIG. 6 from the bottom.

A common wheel cylinder of the standard type is generally indicated at 12 in FIG. 2 and such wheel cylinders have a threaded bleeder outlet opening 80.

Each bleeder opening 80 has an internal seat 84 therein at an inner end thereof, the seat 84 being a cavity of frustro-conical shape, the inner end of which is joined to a canal 100 which leads to the interior of the hydraulic cylinder 12 and outwardly through which the hydraulic fluid will flow at times when an operator presses on the brake pedal of the automobile.

The outlet opening 80 is provided with threads at 110 along an outer portion of the outlet opening 80 and extending to the outermost part of the opening 80 in the conventional manner.

In accordance with this invention, an elongated body 90 of the combination closure and bleeder valve assembly 70 of this invention is provided and has a longitudinal axis 92.

The elongated body 90 has a forward end 112 which is frustro-conical or substantially conical in shape having a side surface which is frustro-conical in shape as seen at 114 and having a central surface 120 which can be of any shape so long as it does not interfere with a snug fitting between the frustro-conical surface 112 and with the frustro-conical forward end surface 84 of the threaded bleeder outlet opening 80.

It is important that the forward end 112 have a closure surface which is symmetrical about axis 92 for seating against the seat 84.

The body 90 has a set of external threads 124 in engagement with the threads 110 earlier described.

The body 90 has a longitudinal bleeder passage 150 extending from adjacent its outer end to a point which is adjacent its inner end, but the latter point being spaced outwardly from its closure surface 114 of the body.

The bleeder passage 150 has an annular internal shoulder therein seen at 160 defining a spring check valve seat for receiving a spring check valve or spring check valve ball 164 thereagainst and forming a part of a spring check valve assembly.

Figure 3:
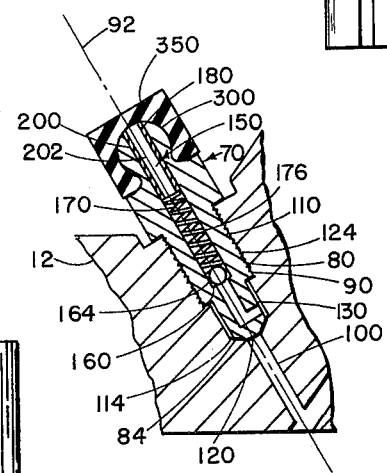
FIG. 3 is a sectional view taken along the axis of the body of the combination closure and bleeder valve assembly of FIG. 2 showing in section a portion of the hydraulic cylinder in which it is mounted.
Figure 4:
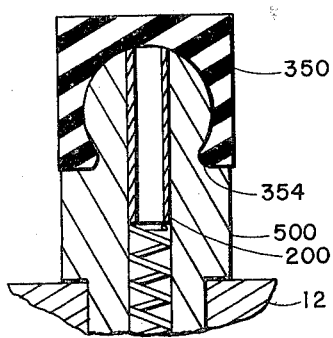
FIG. 4 is a detail showing an enlargement of the outer portion of the assembly of FIG. 1 and a part of the brake cylinder.
Figure 5:
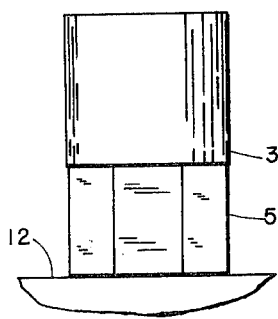
FIG. 5 is a view of the outer portion of the closure and bleeder valve assembly of this invention as it would be seen in side elevation mounted on the hydraulic cylinder, a portion of which latter is shown.
Figure 6:
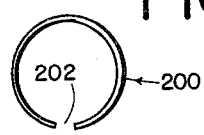
FIG. 6 is a detail showing the roll-pin retainer of this invention as seen in an end view taken parallel to the axis of the body of the retainer and of the valve assembly.

A compression spring 176 disposed outwardly of and bearing against the valve 164 is a further part of the check valve assembly 170. The body 90 has a certain internal side wall 180, best seen in FIG. 3, and surrounding an outer portion of the passage 150. An elongated spring retainer is disposed in the outer portion 180 of the passage and presses transversely of and against the certain internal sidewall portion 180 of the passage 150 with a force sufficient for the purpose of anchoring the retainer 200 in place against the force of the spring 176.

The spring retainer 200 is specifically an elongated roll-pin formed of resilient material and having a cross-section at any point along its length which is substantially C-shaped, the roll-pin or spring retainer 200 having a continuous slot 202 extending from one end to the other thereof, and which latter can be along one side thereof.

The outer end of the body 90 is provided with a bulbous portion 300 for receiving a dust cap 350 which is for the purpose of keeping dust from entering the passage 150.

Such dust caps 350 are commonly used on grease fittings, but this is the first combination closure and bleeder valve assembly which is provided with a dust cap and which is provided with a bulbous portion 300 specifically shaped for cooperation with the dust cap 350 for fitting into the dust cap.

The entrance opening 354 of the dust cap is of a size for receiving the portion of the bulbous portion 300 therethrough which is of maximum diameter only by means of stretching and the cap 350 will be understood to be resilient and adapted to yield so that its opening 354 can stretch to a larger size to pass around the largest part of the bulbous portion and then to contract inwardly until it is of a size lesser for gripping the side of the bulbous portion which is closest to the check valve 170.

Between the bulbous portion 300 and the threads 124 is a wrench-receiving portion 500 which can be of hexagonal shape, for example.

We claim:

1. A combination closure and bleeder valve assembly for permanent mounting in the threaded bleeder outlet opening of a hydraulic system, said opening having an internal seat therein, said assembly comprising: an elongated body having a longitudinal axis, said body having a forward end having a closure surface symmetrical about said axis for seating against said seat, said body having a set of external threads intermediate the ends thereof, said body having a longitudinal bleeder passage extending from adjacent its outer end to a point which is adjacent its inner end but is spaced outwardly from said closure surface, said passage having an annular internal shoulder therin defining a spring check valve seat, a check valve in said passage adjacent said spring check valve seat, a compression spring in said passage and disposed rearwardly from said check valve, said body having a certain internal sidewall portion surrounding an outer portion of said passage, an elongated spring retainer in said outer portion of said passage and pressing transversely of and against said certain internal sidewall portion with a force sufficient for the purpose of anchoring said retainer in place against the force of said spring, said spring retainer being specifically an elongated roll-pin formed of resilient material and having a cross-section at any point along its length which is substantially C-shaped, said roll-pin having a continuous slot extending from one end to the other thereof.

2. The assembly of claim 1 further comprising: said body having a bulbous portion at its outer end for receiving a cap.

3. The assembly of claim 1 further comprising: the side surfaces of said body having a wrench-receiving section disposed rearwardly of said external threads.

4. The assembly of claim 1 further comprising: said body having a bulbous portion at its outer end for receiving a cap.

5. The combination of claim 4 in which a resilient dust cap is removably received on said bulbous portion, said cap having an opening in one side thereof which is normally of a lesser size than the maximum circumference of said bulbous portion, said cap being sufficiently resilient so as to permit its said opening to stretch to receive therethrough that part of said bulbous protion which is maximum circumference, the cap being retained in place on said bulbous portion by its contraction to normal shape.

6. The assembly of claim 5 further comprising: the side surfaces of said body having a wrench-receiving section disposed rearwardly of said external threads.

7. The assembly of claim 1 further comprising: said body having a bulbous portion at its outer end for receiving a cap, a dust cap having an opening in one side thereof which is normally of a lesser size than the maximum circumference of said bulbous portion, said cap being sufficiently resilient so as to permit its said opening to stretch to receive therethrough that part of said bulbous portion which is of maximum circumference, the cap being retained in place on said bulbous portion by its contraction to normal shape.

8. The assembly of claim 7 further comprising: the side surfaces of said body having a wrench-receiving section disposed rearwardly of said external threads.

\* \* \* \* \*